(12) United States Patent
Xu et al.

(10) Patent No.: US 10,555,286 B2
(45) Date of Patent: Feb. 4, 2020

(54) UPLINK CONTROL INFORMATION (UCI) TRANSMISSION WITH BUNDLING CONSIDERATIONS

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 14/444,824

(22) Filed: Jul. 28, 2014

(65) Prior Publication Data

US 2015/0036618 A1    Feb. 5, 2015

Related U.S. Application Data

(60) Provisional application No. 61/860,047, filed on Jul. 30, 2013.

(51) Int. Cl.
*H04W 72/04* (2009.01)
*H04W 28/00* (2009.01)
(Continued)

(52) U.S. Cl.
CPC ............... *H04W 72/0413* (2013.01)

(58) Field of Classification Search
CPC ............ H04W 72/0413; H04W 5/0055
(Continued)

(56) References Cited

U.S. PATENT DOCUMENTS

| 9,742,590 B2 | 8/2017 | Abraham et al. |
| 2009/0232095 A1* | 9/2009 | Ahn ............... H04W 74/006 370/331 |

(Continued)

FOREIGN PATENT DOCUMENTS

| CN | 102763363 A | 10/2012 |
| CN | 102845038 A | 12/2012 |

(Continued)

OTHER PUBLICATIONS

China Telecom: "Discussion on coverage improvement for MTC," 3GPP Draft; R1-124793, 3rd Generation Partnership Project (3GPP), Mobile Competence Centre; 650, Route Des Lucioles; F-06921 Sophia-Antipolis Cedex; France, RAN WG1, New Orleans, USA; Nov. 12, 2012-Nov. 16, 2012, Nov. 2, 2012 (Nov. 2, 2012), XP050662624, 6 pages, Retrieved from the Internet < URL : http://www.3gpp.org/ftp/tsg_ran/WG1_RL1/TSGR1_71/Docs/ >, [retrieved on Nov. 2, 2012].

(Continued)

*Primary Examiner* — Khaled M Kassim
*Assistant Examiner* — Jason A Harley
(74) *Attorney, Agent, or Firm* — Patterson & Sheridan, L.L.P.

(57) ABSTRACT

Certain aspects of the present disclosure provide techniques and apparatus that may be applied for sending uplink control information (UCI) as bundled transmissions. According to aspects, a UE may determine a first bundling size for transmitting a PUSCH, determine a second bundling size for transmitting the UCI, and transmit the UCI and the PUSCH as bundled transmissions according to the first and second bundling sizes. The BS may receive the UCI and the PUSCH as bundled transmissions from the UE according to the determined first and second bundling sizes.

23 Claims, 9 Drawing Sheets

(51) Int. Cl.
*H04W 72/02* (2009.01)
*H04W 52/14* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2009/0316626 A1* | 12/2009 | Lee | ....................... | H04L 1/1607 370/328 |
| 2010/0271970 A1* | 10/2010 | Pan | ....................... | H04L 1/0026 370/252 |
| 2011/0092201 A1* | 4/2011 | Lindstrom | ............ | H04W 24/10 455/424 |
| 2011/0092219 A1 | 4/2011 | Damnjanovic et al. | | |
| 2011/0243094 A1* | 10/2011 | Dayal | ................... | H04W 16/14 370/331 |
| 2013/0194994 A1* | 8/2013 | Dayal | ............... | H04W 72/1215 370/311 |
| 2013/0215807 A1* | 8/2013 | Yang | ..................... | H04L 1/0026 370/281 |
| 2013/0242889 A1* | 9/2013 | Khoryaev | ......... | H04W 72/0413 370/329 |
| 2013/0250822 A1* | 9/2013 | Yang | ....................... | H04L 5/001 370/280 |
| 2014/0269452 A1* | 9/2014 | Papasakellariou | ... | H04B 7/2643 370/280 |
| 2014/0362832 A1* | 12/2014 | Rudolf | .................. | H04L 1/1822 370/336 |
| 2015/0131494 A1* | 5/2015 | He | ....................... | H04B 7/0469 370/280 |

FOREIGN PATENT DOCUMENTS

| | | | |
|---|---|---|---|
| JP | 2011523263 A | | 8/2011 |
| WO | WO-2011050137 A1 | | 4/2011 |
| WO | WO-2012006472 A2 | | 1/2012 |

OTHER PUBLICATIONS

Huawei et al: "Coverage analysis on (E)PDCCH and PUCCH for low-cost MTC UEs", 3GPP Draft; R1-130889, 3rd Generation Partnership Project (3GPP), Mobile Competence Centre ; 650, Route Des Lucioles ; F-06921 Sophia-Antipolis Cedex ; France vol. RAN WG1, No. Chicago, USA; Apr. 15, 2013-Apr. 19, 2013 Apr. 6, 2013 (Apr. 6, 2013), XP050696890, Retrieved from the Internet: URL:http://www.3gpp.orgjftpjtsgranjWG1 RL 1/TSGR1 72b/Docs/— [retrieved on Apr. 6, 2013] p. 3.

Interdigital Communications et al: "Uplink control information multiplexing in TTI bundling mode and Draft CR", 3GPP Draft; R1-083897, 3rd Generation Partnership Project (3GPP), Mobile Competence Centre ; 650, Route Des Lucioles ; F-06921 Sophia-Antipolis Cedex ; France, No. Prague, Czech Republic; Sep. 28, 2008, Sep. 28, 2008 (Sep. 28, 2008), XP050317208, [retrieved on Sep. 28, 2008] p. 5.

International Search Report and Written Opinion—PCT/US2014/048548—ISA/EPO—dated Oct. 21, 2014.

New POSTCOM: 11 UL Coverage Improvement and Evaluation for Low Cost MTC 11 3GPP Draft: R1-131128 UL Coverage Improvement and Evaluation for Low Cost MTC, 3rd Generation Partnership Project (3GPP). Mobile Competence Centre ' 658, Route Des Lucioles F-86921 Sophia-Antipolis v' al. RAN WG1, No. Chicago, USA; Apr. 15, 2013 Apr. 19, 2013 Apr. 6, 2013 (Apr. 6, 2013). XP050697060, Retrieved from the Internet: URL:http://www.3gpp.org/ftpjtsg_ran/WG1_RL 1/TSGR1 72b/Docs/ [retrieved on Apr. 6, 2013] p. 3-p. 4.

New POSTCOM: "UL Coverage Improvement and Evaluation for Low Cost MTC", 3GPP Draft; R1-131120 UL Coverage Improvement and Evaluation for Low Cost MTC, 3rd Generation Partnership Project (3GPP), Mobile Competence Centre; 650, Route Des Lucioles; F-06921 Sophia-Antipolis, vol. RAN WG1, No. Chicago, USA; Apr. 15, 2013-Apr. 19, 2013, Apr. 6, 2013 (Apr. 6, 2013), 4 Pages, XP050697060, Retrieved from the Internet: URL: http://www.3gpp.org/ftp/tsg_ran/WG1_RL1/TSGR1_72b/Docs/ (retrieved on Apr. 6, 2013].

* cited by examiner

Case 1

PUSCH bundled transmission

UCI Bundled Tx

Case 2

PUSCH bundled transmission

UCI Bundled Tx

Case 3

PUSCH bundled transmission

UCI Bundled Tx

Case 4

PUSCH bundled transmission

UCI Bundled Tx

UPLINK CONTROL INFORMATION (UCI) TRANSMISSION WITH BUNDLING CONSIDERATIONS

CROSS-REFERENCE TO RELATED APPLICATION

The present Application for Patent claims priority to U.S. Provisional Application No. 61/860,047, filed Jul. 30, 2013, which is expressly incorporated herein by reference in its entirety.

BACKGROUND

Field

Certain aspects of the present disclosure generally relate to wireless communications and, more particularly, to considerations for sending uplink control information (UCI) as bundled transmissions.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance coverage of certain devices, such as MTC devices, "bundling" may be utilized in which certain transmissions are sent as a bundle of transmissions, for example, with the same information transmitted over multiple subframes.

SUMMARY

Certain aspects of the present disclosure provide techniques and apparatus that may be applied for sending uplink control information (UCI) as bundled transmissions.

Certain aspects of the present disclosure provide a method of transmitting uplink control information (UCI) as a bundled transmission over a bundle of subframes by a user equipment (UE). The method generally includes determining a first bundling size for transmitting a physical uplink shared channel (PUSCH), determining a second bundling size for transmitting the UCI, and transmitting the UCI and the PUSCH as bundled transmissions according to the first and second bundling sizes.

Certain aspects of the present disclosure provide a method of receiving uplink control information (UCI) as a bundled transmission over a bundle of subframes by a base station (BS). The method generally includes determining a first bundling size for a user equipment (UE) to transmit a physical uplink shared channel (PUSCH), determining a second bundling size for the UE to transmit the UCI, and receiving the UCI and the PUSCH as bundled transmissions from the UE according to the first and second bundling sizes.

Certain aspects of the present disclosure provide an apparatus for transmitting uplink control information (UCI) as a bundled transmission over a bundle of subframes. The apparatus generally includes means for determining a first bundling size for transmitting a physical uplink shared channel (PUSCH), means for determining a second bundling size for transmitting the UCI, and means for transmitting the UCI and the PUSCH as bundled transmissions according to the first and second bundling sizes.

Certain aspects of the present disclosure provide an apparatus for receiving uplink control information (UCI) as a bundled transmission over a bundle of subframes. The apparatus generally includes means for determining a first bundling size for a user equipment (UE) to transmit a physical uplink shared channel (PUSCH), means for determining a second bundling size for the UE to transmit the UCI, and means for receiving the UCI and the PUSCH as bundled transmissions from the UE according to the first and second bundling sizes.

Certain aspects of the present disclosure provide an apparatus for transmitting uplink control information (UCI) as a bundled transmission over a bundle of subframes. The apparatus generally includes at least one processor and a memory coupled to the at least one processor. The at least one processor is generally configured to determine a first bundling size for transmitting a physical uplink shared channel (PUSCH) and determine a second bundling size for transmitting the UCI. The apparatus may be configured to transmit the UCI and the PUSCH as bundled transmissions according to the first and second bundling sizes.

Certain aspects of the present disclosure provide an apparatus for receiving uplink control information (UCI) as a bundled transmission over a bundle of subframes. The apparatus generally includes at least one processor and a memory coupled to the at least one processor. The at least one processor is generally configured to determine a first bundling size for a user equipment (UE) to transmit a physical uplink shared channel (PUSCH) and determine a second bundling size for the UE to transmit the UCI. The apparatus may be configured to receive the UCI and the PUSCH as bundled transmissions from the UE according to the first and second bundling sizes.

Certain aspects of the present disclosure provide a computer readable medium for transmitting uplink control information (UCI) as a bundled transmission over a bundle of subframes by a user equipment (UE). The computer readable medium generally has instructions stored thereon, the instructions executable by one or more processors for determining a first bundling size for transmitting a physical uplink shared channel (PUSCH), determining a second bundling size for transmitting the UCI, and transmitting the UCI and the PUSCH as bundled transmissions according to the first and second bundling sizes.

Certain aspects of the present disclosure provide a computer readable medium for receiving uplink control information (UCI) as a bundled transmission over a bundle of subframes by a base station (BS). The computer readable medium generally has instructions stored thereon, the instructions executable by one or more processors for determining a first bundling size for a user equipment (UE) to transmit a physical uplink shared channel (PUSCH), determining a second bundling size for the UE to transmit the UCI, and receiving the UCI and the PUSCH as bundled transmissions from the UE according to the first and second bundling sizes.

Numerous other aspects are provided including methods, apparatus, systems, computer program products, and processing systems.

DETAILED DESCRIPTION

Aspects of the present disclosure provide techniques that may be applied for sending uplink control information (UCI) as bundled transmissions. Such techniques may allow bundling to be used in conjunction with power savings modes, such as DRX modes.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
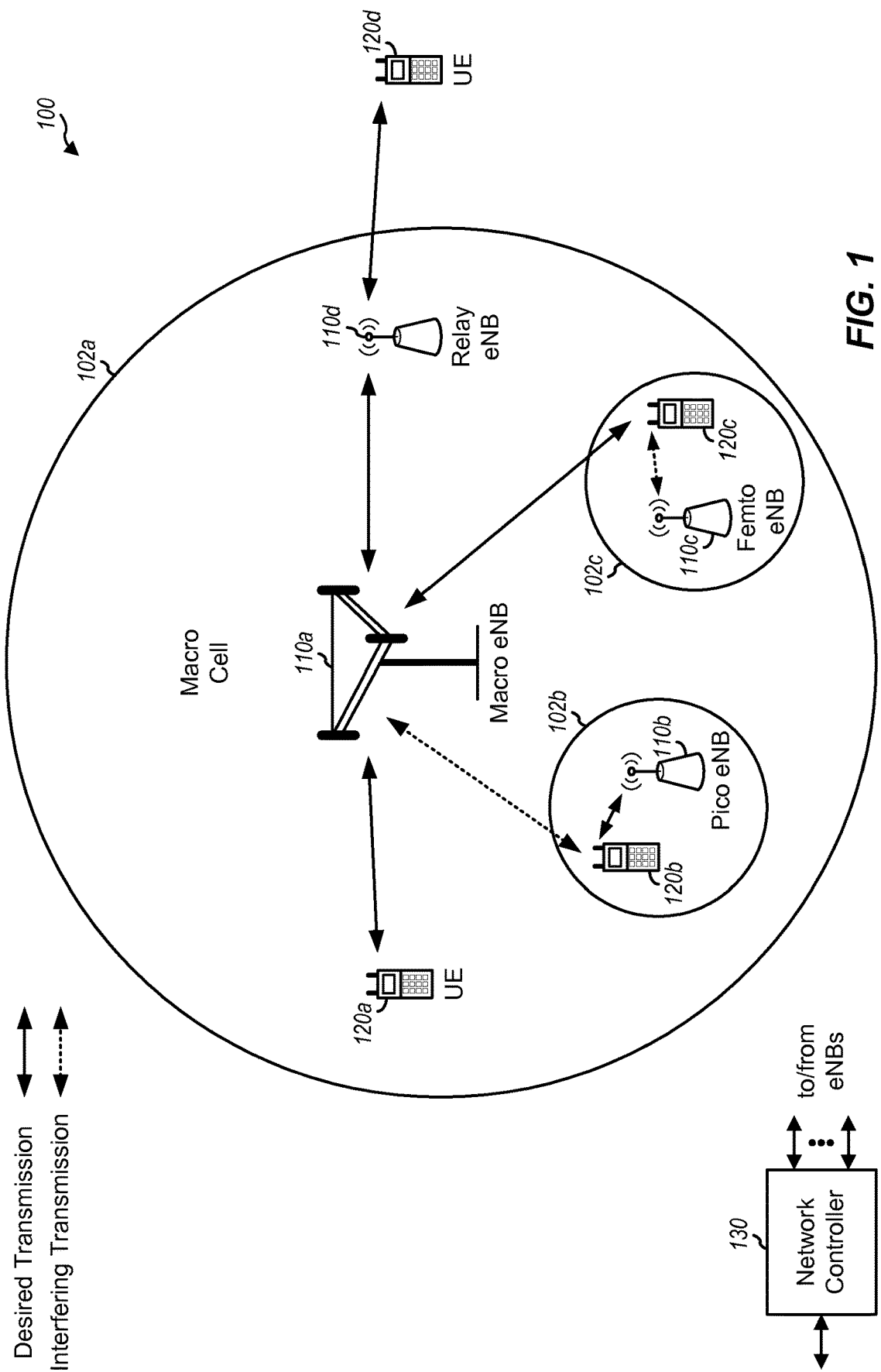
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
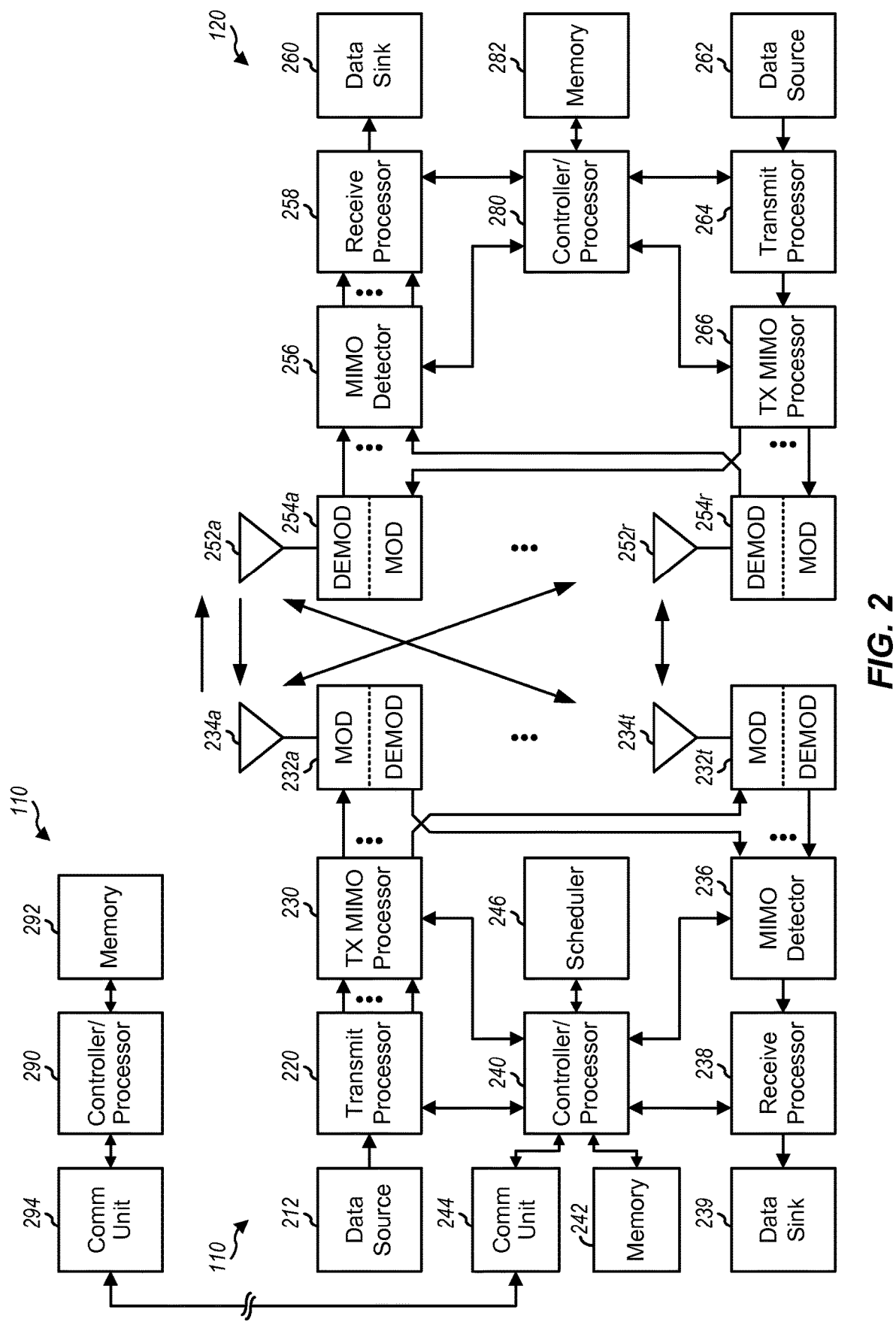
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs 110 and one of the UEs 120 in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

As noted above, in some cases, "bundling" may be applied, for example, where the UE transmits certain information over a "bundle" of subframes. In such cases, when transmitting UCI and PUSCH, the UE 120 may be configured to determine a first bundling size for transmitting the PUSCH physical uplink shared channel and determine a second bundling size for transmitting the UCI. For example, one or more modules of UE 120, including the controller/processor 280 may be configured to determine the first and second bundling sizes. The UE may transmit UCI and PUSCH using one or more modules illustrated in FIG. 2, such as the antennas 252a-r.

Similarly, when receiving UCI as a bundled transmission over a bundle of subframes, the BS 110 may determine a first bundling size for the UE to transmit a PUSCH and determine a second bundling size for the UE to transmit the UCI. For example, one or more modules of BS 110 may perform these determinations, including the controller/processor 240. The BS 110 may receiving the UCI and the PUSCH as bundled transmissions from the UE according to the first and second bundling sizes using one or more modules illustrated in FIG. 2, such as the antennas 234*a-t*.

Figure 3:
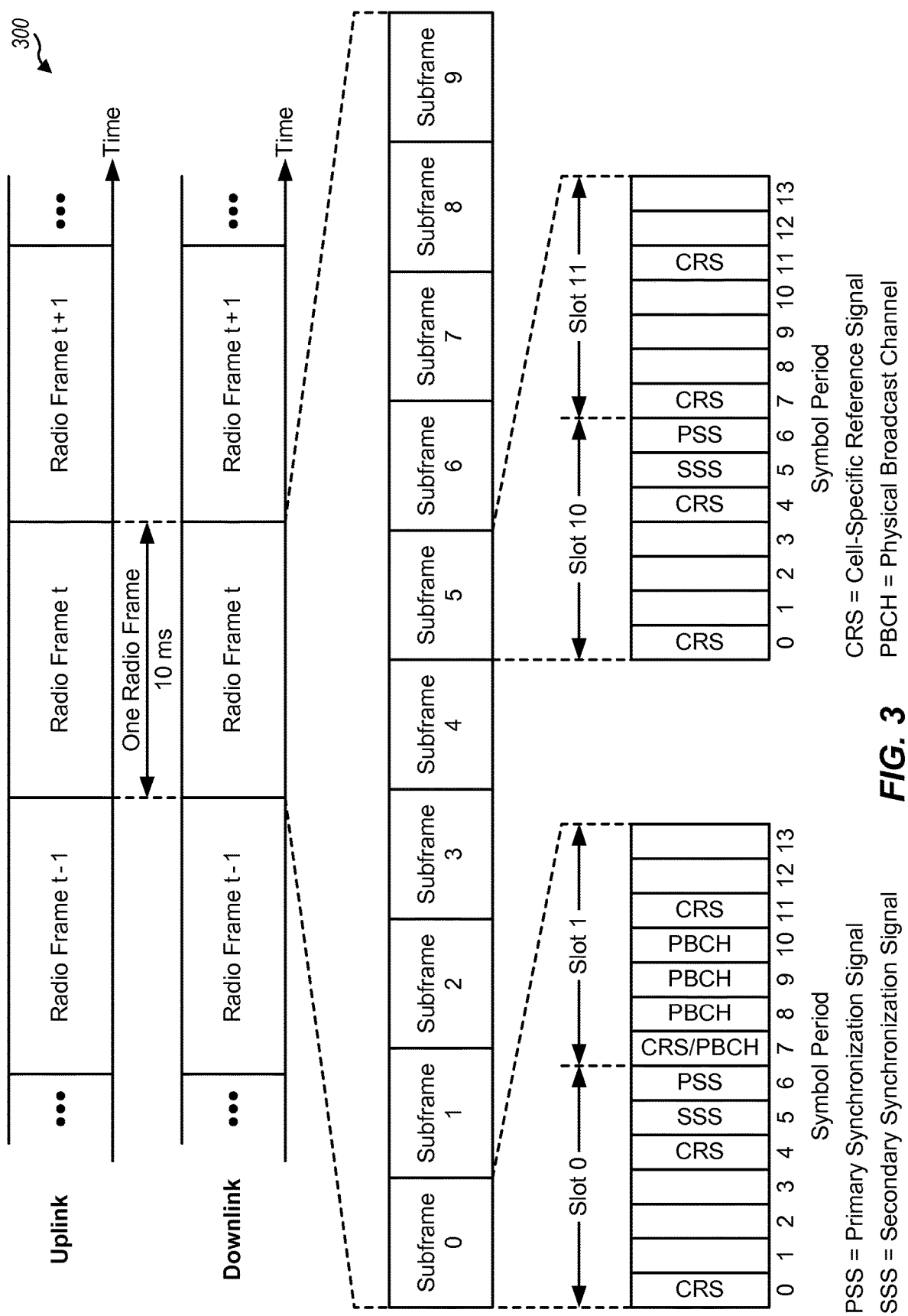
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
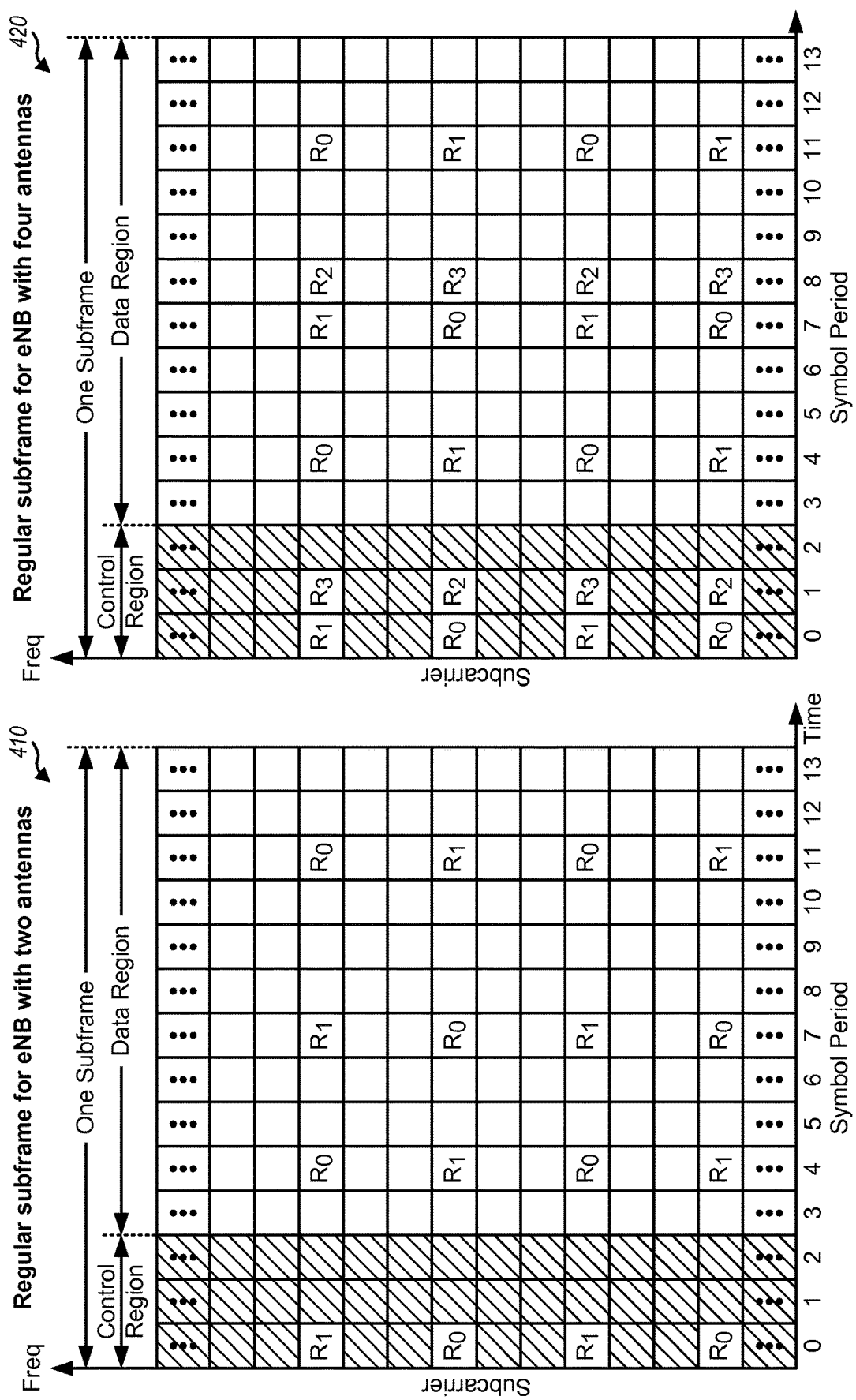
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Multiplexing UCI and UL-SCH Data in PUSCH

Figure 5:
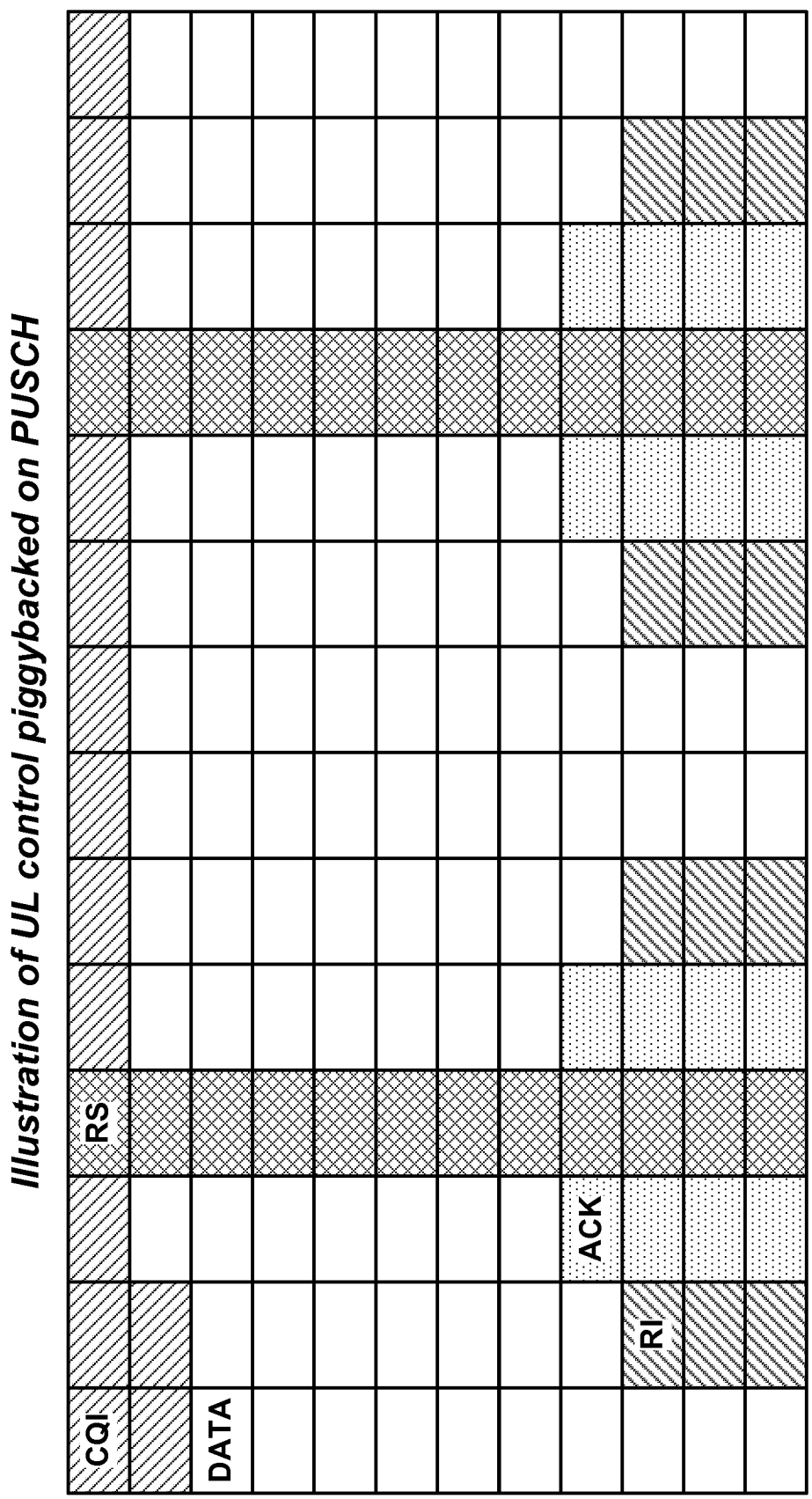
FIG. 5 illustrates an example of transmitting uplink control information (UCI) via physical uplink shared channel (PUSCH) transmissions, in accordance with certain aspects of the present disclosure.

As illustrated in FIG. 5, uplink control information (UCI) may be "piggybacked" with a physical uplink shared channel (PUSCH). In such cases, control and data may be multiplexed prior to a discrete Fourier transform (DFT) operation, with same power gain applied to the control and data. The UCI may include any type of uplink control information, such as channel quality indicator (CQI), precoding matrix indicator (PMI), acknowledgements/negative-acknowledgements (ACK/NACKs) of downlink transmissions, and rank indication (RI). As illustrated in FIG. 5, the UCI (CQI, ACK/NACK, and RI) is multiplexed with the data transmitted on the PUSCH.

For piggybacking CQI/PMI, a same modulation scheme as PUSCH may be used. Reed-Muller code may be used for for payload ≤11 bits or convolutional coding, otherwise. Time-first mapping around PUSCH at the beginning of data source may be applied. For ACK/NAK, coding and modulation may be performed to maximize Euclidean distance. ACK/NAK puncturing (e.g., 4 OFDM symbols right next to demodulation reference signal (DM-RS) symbols) may also be performed. For RI, RI may be placed right next to ACK/NAK symbol positions irrespective of the actual presence of ACK/NACK. Uplink shared channel (UL-SCH) data may be rate-matched around RI resource elements (REs), similar to the case of CQI/PMI.

When there is an UL control channel transmission, e.g., CQI, RI, PMI, and/or ACK/CQI, in the same subframe where PUSCH is transmitted, there are different transmission options. For example, UCI multiplexed with PUSCH may be transmitted in single carrier waveform, which may yield power amplifier (PA) efficiency and resources of UCI may be configurable. UCI and PUSCH transmitted in parallel in the same subframe at different frequency locations may result in lower PA efficiency, but may reduce blind decoding. If the UE is in DRX state, CQI/sounding reference signal (SRS) may be dropped to save energy.

DRX Operation

Figure 6:
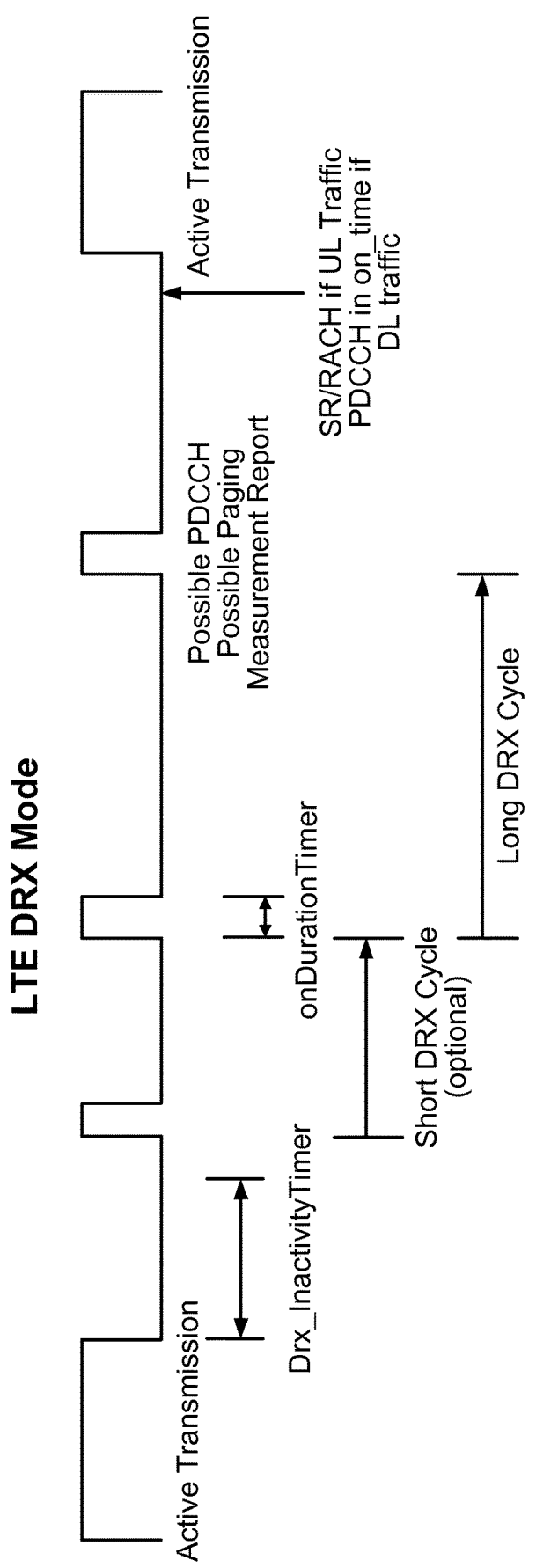
FIG. 6 illustrates an example timing of a discontinuous reception (DRX) mode, in accordance with certain aspects of the present disclosure.

Power consumption is one of the most important aspects for smartphones as well as for other mobile devices. Various mechanisms have been designed to help reduce power consumption, such as discontinuous reception (DRX) mode in LTE. DRX is generally designed in LTE to allow efficient power saving while in radio resource control (RRC) connected mode. As illustrated in FIG. 6, in the DRX mode, the UE alternates between ON periods where active transmission/reception is allowed and OFF durations of inactivity.

TTI Bundling

In some cases, to enhance coverage, transmissions may be bundled, where data or control is transmitted over a "bundle" of subframes, enhancing probability of successful reception by a receiver. In LTE Re1-8/9/10, transmission time interval (TTI or subframe) bundling can be configured on a per UE basis. The subframe bundling operation is typically configured (e.g., by the parameter "ttiBundling" provided) by higher layers.

If TTI bundling is configured for a UE, the subframe bundling operation is typically only applied to uplink shared channel (UL-SCH) transmissions, but not applied to other UL signals/traffic (such as UCI). The bundling size may be fixed, for example, at 4 subframes, meaning PUSCH will be transmitted in 4 consecutive subframes. The same hybrid ARQ (HARQ) process number is typically used in each of the bundled subframes. Resource allocation size may be restricted to up to 3 RBs and the modulation order may be set to 2 (quadrature phase shift keying, QPSK). A bundle is typically treated as a single resource, for example, with a single grant and a single hybrid-ARQ acknowledgement used for each bundle.

Bundling is typically used for low rate traffic. If uplink Voice over Internet Protocol (VoIP) packets cannot be transmitted in a single TTI due to a low uplink link budget, Layer 2 (L2) segmentation may be applied. For example, a VoIP packet could be segmented in 4 radio link control (RLC) protocol data units (PDUs) that are transmitted in 4 consecutive TTIs and 2-3 hybrid automatic repeat request (hybrid ARQ, HARQ) retransmissions might be targeted to achieve sufficient coverage. This approach may have various drawbacks, however. For example, each additional segment introduces a 1 byte RLC, 1 byte medium access control (MAC), and 3 byte L1 cyclic redundancy check (CRC) overhead (e.g., 15% overhead assuming a 33 byte RLC service data unit (SDU) size, which would mean for 4 segments, there is an additional L1/L2 overhead of 45%). HARQ transmissions/retransmissions for every segment may require grants on a Physical Downlink Control Channel (PDCCH) consuming significant PDCCH resources. Each HARQ transmission or retransmission is typically followed by HARQ feedback on the Physical Hybrid-ARQ Indicator Channel (PHICH). Assuming a NACK-ACK error ratio of $10^{-3}$, the large number of HARQ feedback signals leads to high packet loss probabilities. For example, if 12 HARQ feedback signals are sent, the HARQ feedback error ratio might be in the order of $1.2*10^{-2}$. Packet loss rates of more than $10^{-2}$ may be unacceptable for VoIP traffic.

Usage of only a single uplink grant and a single PHICH signal per TTI bundle, as proposed herein, may be advantageous and reduce the signaling overhead described above.

Potential solutions to achieve improvements in medium data rate PUSCH and UL VoIP include TTI bundling enhancements for medium data rate and VoIP. Both L1/Higher layer protocols overhead and latency may be considered.

A main focus of the traditional LTE design has been on the improvement of spectral efficiency, ubiquitous coverage, enhanced quality of service (QoS) support, and the like. This typically results in high-end devices, such as the state-of-art smartphones, tablets, and the like. However, low-cost, low-rate devices need to be supported as well. Some market projections show that the number of low-cost devices may largely exceed today's cell phones.

In addition to low-cost requirements, a 20 dB coverage enhancement may be required to cover devices in poor coverage areas ("the basement"). In order to meet this requirement, a large TTI bundling may be used to achieve 20 dB link budget gain: on the DL, TTI bundling may be used for PBCH, PDCCH/enhanced PDCCH (ePDCCH), PHICH, PDSCH; on the UL, TTI bundling may be used for random access channel (RACH), Physical Uplink Control Channel (PUCCH), Physical Uplink Shared Channel (PUSCH); and a bundling size of ~100 TTI may be used for different channels.

UCI Transmission With Bundling Considerations

The current design for UCI is mostly optimized for single (non-bundled) TTI transmissions. Aspects of the present disclosure, however, present techniques that may be applied for transmitting UCI in bundled TTIs, such as in coverage enhancements. Thus, the techniques presented herein may help address issues related to bundling UCI, such as whether to drop or transmit UCI on PUSCH (in a current standard with PUSCH bundle size 4, periodic CQI is always dropped, and ACK is transmitted on one subframe only), how long to bundle UCI, and how to calculate resources for UCI on PUSCH.

Regarding how to bundle UCI, according to certain aspects, bundling size(s) may be determined independently for UCI and PUSCH. For example, there may be a PUSCH bundle size of K and a UCI bundle size of M. In some cases, there may be two separate bundle sizes—one size for standalone PUCCH and one size for UCI on PUSCH. For example, when UCI is transmitted on PUCCH, a UE may use a bundle size of M1 and when UCI is transmitted on PUSCH, the UE may use a bundle size of M2.

According to certain aspects, UCI and PUSCH bundling sizes may be linked. For example, there may be a defined set of linked values for UCI and PUSCH bundle sizes (e.g., defined in a standard) and a base station (e.g., eNodeB) may signal the configuration to the UE. In some cases, the base station may only signal a size for one set of bundled transmissions. For example, the base station may signal a bundling size for PUSCH and the UE may calculate the corresponding UCI bundle size according to the PUSCH bundle size (and/or UCI formats).

Figure 7:
FIG. 7 illustrates example scenarios for bundled UCI transmissions, in accordance with certain aspects of the present disclosure.
Figure 7:
Figure 7:
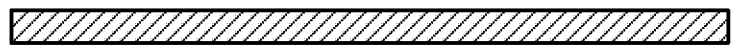
Figure 7:
Figure 7:
Figure 7:
Figure 7:
Figure 7:

Aspects of the present disclosure may also help a UE determine where (e.g., on what resources) to transmit UCI (e.g., relative to PUSCH and/or PDCCH). The determination may be based, at least in part, on whether or not, and to what extent, UCI and PUSCH overlap. FIG. 7 illustrates four example cases in which UCI overlaps with PUSCH to different extents.

For example, if a UCI bundled transmission is entirely within the duration of PUSCH (Case 1), on all subframes where they overlap, UCI may be transmitted within the PUSCH (e.g., SC-FDM).

For other cases (Case 2, 3, and 4) in which UCI and PUSCH only partially overlap, different options exist. For example, in the periods where UCI and PUSCH overlap, UCI may be transmitted on PUSCH; but where they do not overlap, UCI may be transmitted on PUCCH. According to aspects, separate transmissions on different frequency resources may be used for PUSCH and PUCCH. In some cases, one of UCI or PUSCH may be dropped on the overlapping part or dropped whenever the UCI and PUSCH do not align. In some cases, a UE may only drop the UCI part outside of the overlapping PUSCH portion, and transmit the UCI on the PUSCH for the overlapping part.

While conventional UCI resource determination is optimized for single TTI transmission, aspects of the present disclosure may also help a UE decide what resources to use on PUSCH when transmitting bundled UCI. According to certain aspects, UCI resource calculation may be dependent on TTI bundling. For example, a BS may configure two or more different sets of parameters for UCI resource determination: a first set for the case without bundling and a second set for the case with bundling. According to aspects, these sets may have more than one set of parameters for different bundling sizes. The UE may determine resources for UCI based, at least in part, on the TTI bundle size (e.g., for VoIP transmissions may not be bundled, medium data rate bundle, and the like).

In some cases UCI resource calculation may be based, at least in part, on overlap between UCI and PUSCH. For example, depending on whether there is PUSCH and UCI partial overlap, the UE may calculate UCI resources on PUSCH differently. If bundled UCI and PUSCH partially align (such as in Cases 2 and 3 illustrated in FIG. 7), the UE may apply a different UCI resource calculation. This may help account for the inability to combine channel estimation for the part that PUSCH and UCI overlap or to account for possible power variation.

Aspects of the present disclosure may also help a UE decide whether to drop UCI when transmitting bundled UL data. In conventional systems, the CQI and SRS are dropped outside of the ON duration if the UE is in DRX, and the CQI and SRS are not dropped during UE active data communications state. If the UE bundled data transmissions/reception are longer than ON duration, the UE should be considered in active state. As a result, by current specifications, SRS and UCI (e.g., ACK/CQI) will need to be transmitted. One issue may be the UL transmission phase continuity and link efficiency.

According to certain aspects, for UL bundled data, the UE may drop SRS and/or CQI during the UL bundled transmission based on one or more transmission parameters (e.g., bundling length, transport block size (TBS), resource allocation size, and the like). Both RI and ACK may still be transmitted, however. The reason for dropping SRS may be that the power difference between SRS and PUSCH may cause phase discontinuity, which is assumed stable for UL bundling. As an alternative, rather than dropping SRS, the SRS may be transmitted at the same power as PUSCH. The reason for dropping CQI may be to provide better coding rate for PUSCH for link budget limited users. However, if the bundle size is small or the data rate is large enough or large resource allocation (RB) is assigned, CQI and SRS may also be transmitted.

Figure 8:
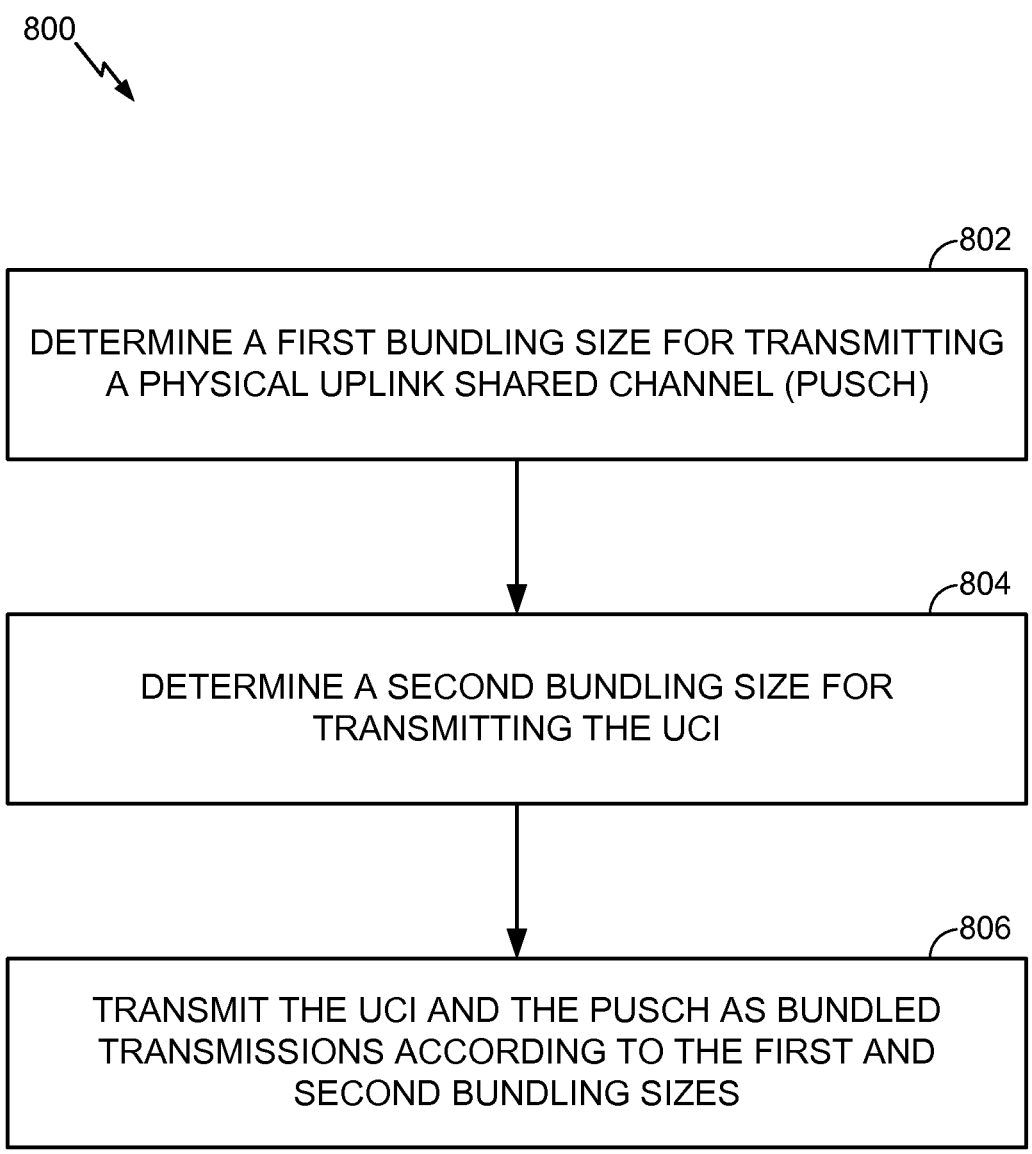
FIG. 8 illustrates example operations for wireless communications, by a user equipment (UE), in accordance with certain aspects of the present disclosure.

FIG. 8 illustrates example operations 800 for transmitting uplink control information (UCI) as a bundled transmission over a bundle of subframes by a user equipment (UE). One or more modules of UE 120 of FIG. 2 may perform the operations and aspects described herein.

The operations 800 begin, at 802, with the UE determining a first bundling size for transmitting a physical uplink shared channel (PUSCH). At 804, the UE determines a second bundling size for transmitting the UCI. At 806, the UE transmits the UCI and the PUSCH as bundled transmissions according to the first and second bundling sizes.

As noted above, in some cases, the first and/or second bundling may be signaled to the UE. In some cases, only one of the bundling sizes may be signaled and the UE may determine the other. For example, the UE may be signaled a first bundling size and determine the second based, at least in part, on the first bundling size.

The UE may determine when to transmit UCI as a bundled transmission, using the first and second bundling sizes, as well as other considerations. For example, the UE may determine when to transmit the UCI as a bundled transmission based, at least in part, on an amount of overlap between the UCI and PUSCH. The UE may, for example, transmit the UCI within PUSCH on all subframes in the bundle where UCI overlaps with PUSCH and/or transmit the UCI within PUCCH on all subframes in the bundle where UCI does not overlap with PUSCH. The UE may also transmit the UCI on different frequency resources depending on whether UCI is transmitted on PUSCH or PUCCH. In some cases, the UE may drop at least one of UCI or PUSCH where UCI and PUSCH overlap or do not align. In some cases, the UE may drop UCI where UCI and PUSCH overlap and transmit UCI where UCI and PUSCH do not overlap.

In some cases, the UE may calculate UCI resources based, at least in part, on one or more parameters of the bundled transmission. In some cases, the UCI resource calculation for bundled transmission is different than UCI resource calculation without bundling (e.g., the UCI resource calculation may be based, at least in part, on bundling size or on an amount of overlap of PUSCH and UCI).

In some cases, the UE may decide what type of UCI to transmit as a bundled transmission based on one or more parameters of the bundled transmission. The one or more parameters of the bundled transmission comprise at least one of: bundling length, transport block size, or resource allocation size. In some cases, the UE may decide to transmit at least one of a rank indication (RI) or a channel quality indicator (CQI) as a bundled transmission. In some cases, the UE may decide to not transmit at least one of a sounding reference signal (SRS) or an acknowledgement (ACK) during the bundled transmission.

Figure 9:
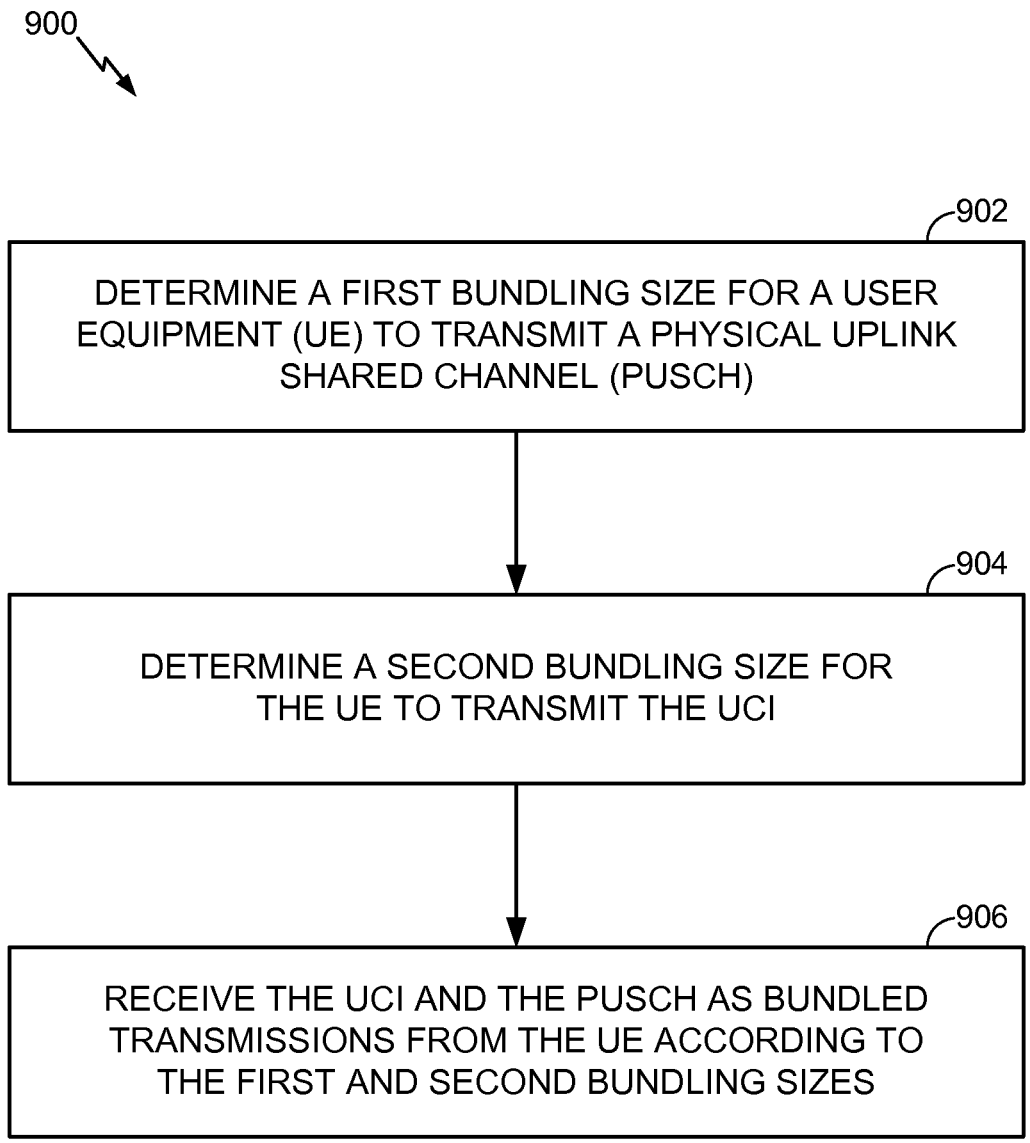
FIG. 9 illustrates example operations for wireless communications, by a base station (BS), in accordance with certain aspects of the present disclosure.

FIG. 9 illustrates example operations 900 for a method of receiving uplink control information (UCI) as a bundled transmission over a bundle of subframes by a base station (BS). The operations 900 may be considered as complementary to the UE-side operations 800 shown in FIG. 8. One or more modules of BS 130 of FIG. 2 may perform the operations and aspects described herein.

The operations 900 begin, at 902, with the BS determining a first bundling size for a user equipment (UE) to transmit a physical uplink shared channel (PUSCH). At 904, the BS determines a second bundling size for the UE to transmit the UCI. At 906, the BS receives the UCI and the PUSCH as bundled transmissions from the UE according to the first and second bundling sizes.

As described above, a separate bundling size may be used for transmitting the UCI, for example, depending on whether the UCI is transmitted on PUCCH or PUSCH.

According to aspects, the BS may further transmit signaling indicating at least one of the first and second bundling sizes. The BS may transmit signaling indicating the first bundling size for the UE to use in determining the second bundling size.

According to the amount of overlap between UCI and PUSCH, the BS may determine when the UE is to transmit the UCI as a bundled transmission. For example, the BS may determine that the UE is to transmit the UCI within PUSCH on all subframes in the bundle where UCI overlaps with PUSCH. According to aspects, the BS may determine the UE is to transmit the UCI as a bundled transmission within PUCCH on all subframes in the bundle where UCI does not overlap with PUSCH. The BS may determine the UE is to transmit the UCI as a bundled transmission on different frequency resources depending on whether UCI is transmitted by the UE on PUSCH or PUCCH.

The BS may further calculate UCI resources based, at least in part, on one or more parameters of the bundled transmission. The BS may use a different UCI resource calculation for bundled transmission as compared to UCI resource calculation without bundling. The UCI resource calculation may be based, at least in part, on bundling size. According to aspects, the UCI resource calculation may be based, at least in part, on an amount of overlap of PUSCH and UCI.

The BS may further determine what type of UCI the UE is to transmit as a bundled transmission based on one or more parameters of the bundled transmission. The one or more parameters of the bundled transmission may include at least one of: bundling length, transport block size, or resource allocation size. According to aspects, determining, by the BS, what type of UCI the UE is to transmit as a bundled transmission based on one or more parameters of the bundled transmission includes determining the UE is to transmit at least one of a rank indication (RI) or a channel quality indicator (CQI) as a bundled transmission. The BS may determine the UE is not to transmit a sounding reference signal (SRS).

Thus, aspects of the present disclosure provide techniques that may be applied for sending UCI as bundled transmissions. The techniques described herein may help address issues related whether to drop or transmit UCI on PUSCH, how long to bundle UCI, and how to calculate resources for UCI on PUSCH.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmitting uplink control information (UCI) as a bundled transmission over a bundle of subframes by a user equipment (UE), comprising:
   determining a first transmission time interval (TTI) bundling size comprising a first plurality of consecutive TTIs for transmitting a physical uplink shared channel (PUSCH), wherein a same hybrid automatic repeat request (HARQ) process number is used in each of the first plurality of consecutive TTIs;
   determining a second TTI bundling size comprising a second plurality of consecutive TTIs for transmitting the UCI, wherein a same HARQ process number is used in each of the second plurality of TTIs;
   determining on which resources to transmit the UCI and PUSCH as bundled transmissions based, at least in part, on an amount of overlap between the UCI and PUSCH, wherein the determining comprises:
      dropping the PUSCH on resources that overlap with the UCI; and
      transmitting the UCI within a physical uplink control channel (PUCCH) on subframes in the bundled transmissions where UCI does not overlap with PUSCH; and
   transmitting the bundled transmissions according to the first and second TTI bundling sizes and the determined resources.

2. The method of claim 1, wherein the second TTI bundling size for transmitting the UCI is based on whether the UCI is transmitted on the PUCCH or is transmitted on the PUSCH.

3. The method of claim 1, further comprising:
   receiving signaling indicating at least one of: the first TTI bundling size or the second TTI bundling size.

4. The method of claim 3, further comprising:
   receiving signaling indicating the first TTI bundling size, wherein
   determining the second TTI bundling size is based, at least in part, on the first TTI bundling size.

5. The method of claim 1, wherein:
   determining on which resources to transmit the UCI and PUSCH as bundled transmissions comprises calculating UCI resources based, at least in part, on a first set of parameters of the bundled transmissions, and
   the first set of parameters for the UCI resource calculation for the bundled transmissions is different than a second set of parameters for UCI resource calculation without bundling.

6. The method of claim 5, wherein the first set of parameters for the UCI resource calculation is different than a third set of parameters for UCI resource calculation for a bundled transmission of a different TTI bundling size.

7. The method of claim 5, wherein the first set of parameters for the UCI resource calculation is different than a fourth set of parameters for UCI resource calculation for a transmission of a different amount of overlap of PUSCH and UCI.

8. The method of claim 1, further comprising deciding what type of UCI to transmit or drop based on one or more parameters of the bundled transmissions.

9. The method of claim 8, wherein the one or more parameters of the bundled transmissions comprise at least one of: bundling length, transport block size, or resource allocation size.

10. The method of claim 8, wherein deciding what type of UCI to transmit as the bundled transmissions comprises:
    deciding to transmit at least one of a rank indication (RI) or a channel quality indicator (CQI) as the bundled transmission.

11. The method of claim 8, wherein:
    the determination comprises determining whether to drop at least one of: a channel quality indicator (CQI) or a sounding reference signal (SRS); and
    the determination is further based on whether the UE is outside of a discontinuous reception (DRX) ON duration.

12. A method of receiving uplink control information (UCI) as a bundled transmission over a bundle of subframes by a base station (BS), comprising:
    determining a first transmission time interval (TTI) bundling size comprising a first plurality of consecutive TTIs for a user equipment (UE) to transmit a physical uplink shared channel (PUSCH), wherein a same hybrid automatic repeat request (HARQ) process number is used in each of the first plurality of consecutive TTIs;
    determining a second TTI bundling size comprising a second plurality of consecutive TTIs for the UE to transmit the UCI, wherein a same HARQ process number is used in each of the second plurality of TTIs;
    determining on which resources the UE is to transmit the UCI and PUSCH as bundled transmissions based, at least in part, on an amount of overlap between the UCI and PUSCH, wherein the determining comprises:
       determining the PUSCH is dropped on resources that overlap with the UCI; and
       determining the UCI is transmitted within a physical uplink control channel (PUCCH) on subframes in the bundled transmissions where UCI does not overlap with PUSCH; and
    receiving the bundled transmissions from the UE according to the first and second TTI bundling sizes and the determined resources.

13. The method of claim 12, wherein the second TTI bundling size for transmitting the UCI is based on whether the UCI is transmitted on the PUCCH or is transmitted on the PUSCH.

14. The method of claim 12, further comprising:
transmitting signaling indicating at least one of: the first TTI bundling size or the second TTI bundling size.

15. The method of claim 14, further comprising:
transmitting signaling indicating the first TTI bundling size for the UE to use in determining the second TTI bundling size.

16. The method of claim 12, wherein:
determining on which resources the UE is to transmit the UCI and PUSCH as a bundled transmissions comprises calculating UCI resources based, at least in part, on a first set of parameters of the bundled transmissions; and
the first set of parameters for the UCI resource calculation for the bundled transmissions is different than a second set of parameters for UCI resource calculation without bundling.

17. The method of claim 16, wherein the first set of parameters for the UCI resource calculation is different than a third set of parameters for UCI resource calculation for a bundled transmissions of a different TTI bundling size.

18. The method of claim 16, wherein the first set of parameters for the UCI resource calculation is different than a fourth set of parameters for UCI resource calculation for a transmission of a different amount of overlap of PUSCH and UCI.

19. The method of claim 12, further comprising determining what type of UCI the UE is to transmit or drop based on one or more parameters of the bundled transmissions.

20. The method of claim 19, wherein the one or more parameters of the bundled transmissions comprise at least one of: bundling length, transport block size, or resource allocation size.

21. The method of claim 19, wherein determining what type of UCI the UE is to transmit as the bundled transmissions comprises determining the UE is to transmit at least one of a rank indication (RI) or a channel quality indicator (CQI) as bundled transmissions.

22. An apparatus for transmitting uplink control information (UCI) as a bundled transmission over a bundle of subframes, comprising:
a memory; and
at least one processor coupled with the memory and configured to:
determine a first transmission time interval (TTI) bundling size comprising a first plurality of consecutive TTIs for transmitting a physical uplink shared channel (PUSCH), wherein a same hybrid automatic repeat request (HARQ) process number is used in each of the first plurality of consecutive TTIs,
determine a second TTI bundling size comprising a second plurality of consecutive TTIs for transmitting the UCI, wherein a same HARQ process number is used in each of the second plurality of TTIs,
determine on which resources to transmit the UCI and PUSCH as bundled transmissions based, at least in part, on an amount of overlap between the UCI and PUSCH, wherein the determining comprises:
dropping the PUSCH on resources that overlap with the UCI and; and
transmitting the UCI within a physical uplink control channel (PUCCH) on subframes in the bundled transmissions where UCI does not overlap with PUSCH; and
transmit the bundled transmissions according to the first and second TTI bundling sizes and the determined resources.

23. An apparatus for receiving uplink control information (UCI) as a bundled transmission over a bundle of subframes, comprising:
a memory; and
at least one processor coupled with the memory and configured to:
determine a first transmission time interval (TTI) bundling size comprising a first plurality of consecutive TTIs for a user equipment (UE) to a physical uplink shared channel (PUSCH), wherein a same hybrid automatic repeat request (HARQ) process number is used in each of the first plurality of consecutive TTIs,
determine a second TTI bundling size comprising a second plurality of consecutive TTIs for the UE to transmit the UCI, wherein a same HARQ process number is used in each of the second plurality of TTIs,
determine on which resources the UE is to transmit the UCI and PUSCH as bundled transmissions based, at least in part, on an amount of overlap between the UCI and PUSCH, wherein the determining comprises:
determining the PUSCH is dropped on resources that overlap with the UCI; and
determining the UCI is transmitted within a physical uplink control channel (PUCCH) on subframes in the bundled transmissions where UCI does not overlap with PUSCH, and
receive the bundled transmissions from the UE according to the first and second TTI bundling sizes and the determined resources.

* * * * *